April 19, 1927.  J. M. SEAWELL  1,625,224

STABILIZER

Filed Nov. 18, 1925

Inventor
Joseph M. Seawell
Joseph W. Hazell
Attorney

Patented Apr. 19, 1927.

1,625,224

UNITED STATES PATENT OFFICE.

JOSEPH M. SEAWELL, OF RICHMOND, VIRGINIA.

STABILIZER.

Application filed November 18, 1925. Serial No. 69,890.

The present invention relates to stabilizers, and particularly to stabilizers for use in connection with the front or steering wheels of an automobile.

An object of the invention is to provide a stabilizing means for use in connection with the steering wheels of an automobile which will prevent the occurrence of what is commonly known as shimmying or unintentional and undesirable vibration of the steering wheels.

A further object of the invention is to provide a device of this character which will accomplish the result stated and will also act to take up wear in connection with the steering knuckle, steering knuckle arms, reach rod, and other parts of the steering mechanism.

A still further object of the invention is to provide such a device which will permit of easy steering of the vehicle and which does not have any tendency to return the wheels to straight-ahead steering position.

Other objects and advantages of the invention will appear from the following description, in which a preferred embodiment of the invention is illustrated by way of example, taken in connection with the accompanying drawing, in which.

Figure 1:
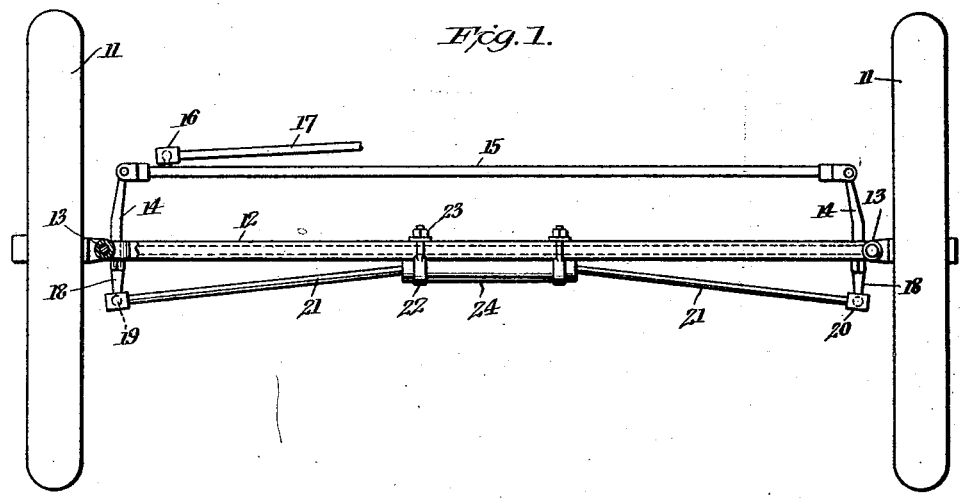
Fig. 1 is a top plan view of the wheels, axle, and so much of the steering mechanism as is necessary to an illustration of the present invention, which is shown applied thereto.

The present invention is particularly adapted for use in connection with an automobile steering mechanism which includes a fixed axle, wheels thereon connected to said axle by steering knuckles, said steering knuckles having arms connected to each other by a reach rod, which in turn is connected by another rod to the steering gear box and by means of which the wheels are given the desired direction.

The invention contemplates the provision of means for exerting pressure, preferably yielding pressure, upon the steering knuckle arms and acting to tend either to compress or extend the reach rod. Accordingly, the yieldable tension means may be provided on either the front or rear of the front axle and may in either case have either an expansion or contraction tendency.

The invention is illustrated as being located on the front or forward part of a fixed automobile axle and the yieldable tension means has been shown in the form of a spring placed under compression.

Referring now in detail to the accompanying drawing, the front wheels 11 are shown as being attached to the front axle 12 of an automobile in the usual manner by means of the steering knuckles 13, which are provided in the usual way with steering knuckle arms 14 connected together at their ends by a reach rod 15 which has a connection 16 near one of its ends to a rod 17 which leads to any usual or convenient form of steering gear box, not shown, as it forms no part of the present invention.

In accordance with the present invention, the steering knuckles 13 are provided with additional arms 18 which are shown as extending forwardly of the axle or in a direction opposite to the customary steering knuckle arms 14 and preferably are located somewhat lower or nearer the ground than said arms 14. The additional steering knuckle arms 18 may be secured to the steering knuckles in any convenient manner such, for example, as by means of a screw-threaded extension provided on the steering knuckles over which screws the auxiliary arm 18.

The auxiliary arms 18 are preferably provided with ball ends 19 which fit in sockets 20, the sockets 20 receiving and holding the tension rods 21, which are shown as extending toward each other.

Fixed to the axle 12 by any convenient means, such as the U-bolt straps 22 and nuts 23, is a spring housing 24. Within the spring housing there is located a coil spring 25 which is placed under compression and bears at its ends against the metallic disks 26 which are connected by rivets 27 to the metallic disks 28, the metallic disks 26 and 28 clamping between them the bottoms of the oppositely extending cup washers 29 and 30, which have their cylindrical peripheral edges in close sliding contact with the inner surface of the housing 24. Expansion metallic spring members 31 are preferably inserted within the friction or cup washers 30 for the purpose of maintaining their cylindrical outer peripheries in close contact with the inner surface of the spring housing 24.

The tension rods 21 are provided preferably with ball ends 32 which bear against the metallic disks 28 and hold the spring 25 under compression.

In assembling this device, the spring housing is clamped on the front axle and the spring to be placed under compression is inserted in the housing. The cup washers may have the ends of this spring affixed to them and may be inserted with the spring into the housing. At this time the spring not being under tension, the cup washers will be located respectively relatively near the ends of the spring housing 24. The wheels of the vehicle are then turned to their extreme limit either to right or left, and depending upon the direction in which they are turned, the appropriate tension rod 21 is inserted into the housing 24 with its ball end 32 bearing against one of the washers, and the dimensions of the parts are so arranged that this can be accomplished only by additional pressure on the wheels tending to force them in the direction towards which they have been turned beyond the limit to which they can be turned by the steering gear. A quick push with sufficient pressure behind it is sufficient to accomplish this. The other reach rod 21 is inserted in the housing 24 in a similar manner, the wheels being turned in the opposite direction for the purpose, and it will be seen that with this method of assembly it is not possible for the steering gear to turn the wheels a sufficient amount in either direction to cause the ball end 32 of the tension rods to come out of the housing 24. It is further to be noted in the assembly of the device that when the second tension rod 21 is to be inserted in the housing 24, the spring 25 must be placed under tension, and this can be done by pressing inwardly on the appropriate cup washer by a screw-driver while the tension rod 21 is being inserted.

Figure 3:
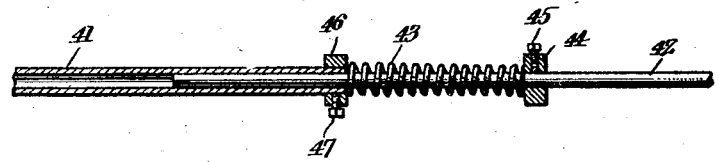
Fig. 3 is a partial detail view illustrating another form of the invention.
Figure 4:
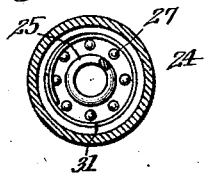
Fig. 4 is a sectional view taken on the line 4—4 of Fig. 2.

Instead of the housing 24, strap bolts 22 and other structure above described, the yieldable tension means may comprise tension rods 41 and 42, shown in Fig. 3, which are secured to the auxiliary steering knuckle arms in the manner above described. One of these arms 41 is hollow while the other 42 fits within it, the insertion of one rod within the other being accomplished in a manner similar to that above described, namely, by forcing the forward parts of the wheels toward each other and then letting them resume their normal parallel position after the insertion has occurred.

A coil spring 43 is shown as surrounding one of the rods 42 and bearing at one end against a stop washer 44 fixed by a set screw 45 to the tension rod 42, the spring 43 bearing at its other end against a similar stop washer 46 secured to the tension rod 41 by a set screw 47. The tension of the spring 43 may be adjusted by varying the position of the stop washer 44.

It will be seen that in both the constructions herein described the wheels are perfectly free to assume any position in which they may be turned by the steering gear, and that the present invention does not cause or tend to cause the wheels to be turned into any other position.

Figure 2:
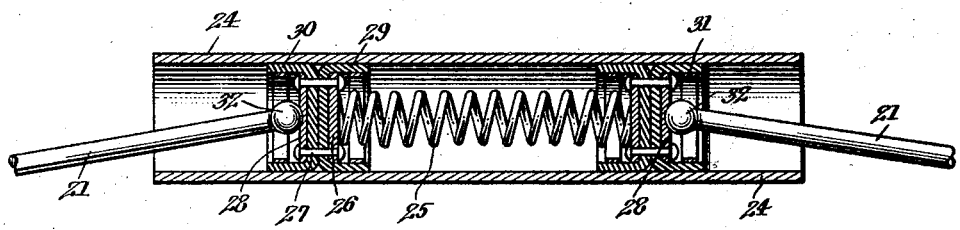
Fig. 2 is an enlarged axial sectional view of the spring housing shown in Fig. 1.

It will also be seen that the friction of the cup washers shown in Fig. 2 may be regulated by leaving them dry or supplying oil thereto in order to regulate the ease with which said friction or cup washers reciprocate in their housing.

Where an obstruction in the roadway is encountered by one of the wheels and it is momentarily deflected sideways, the spring yieldable tension means acts as an aid in preventing the transmission of this deflection to the wheel. Furthermore, depending upon the degree of friction desired between the friction or cup washers and the housing, the relative ease with which the steering gear operates may be regulated. Moreover, it will be seen that by this construction, the yieldable tension means also acts to take up wear of the parts and prevent rattling, and in the example of the invention shown in Fig. 3, the tension of the spring may be regulated at will by varying the position of the stop or abutment washer.

What is claimed is:

1. In a vehicle steering mechanism including wheels, an axle, steering knuckles associated with said wheels and axle, a steering knuckle arm on each of said steering knuckles, a reach rod connecting said steering knuckle arms, and yielding stabilizing means connecting said steering knuckles exerting resilient pressure thereon and maintaining said pressure constant in all steering positions of said wheels, and a fixed guide for part of said yielding stabilizing means guiding said stabilizing means in a straight line.

2. In a vehicle steering mechanism including wheels, an axle, steering knuckles associated with said wheels and axle, a steering knuckle arm on each of said steering knuckles, a reach rod connecting said steering knuckle arms, and stabilizing means connecting said steering knuckles exerting yielding pressure thereon and maintaining said pressure constant in all steering positions of said wheels, said stabilizing means including a tension rod associated with each of said tension rods extending toward one another, their adjacent ends being spaced from each other, and a yielding pressure exerting device between said adjacent and spaced ends connecting said tension rods and tending to keep them separated from each other.

In testimony whereof I affix my signature.

JOSEPH M. SEAWELL.